United States Patent
Shi et al.

(10) Patent No.: US 11,640,489 B2
(45) Date of Patent: May 2, 2023

(54) METHOD, APPARATUS, COMPUTER DEVICE, AND STORAGE MEDIUM FOR AUTOMATIC DESIGN OF ANALOG CIRCUITS BASED ON TREE STRUCTURE

(71) Applicant: SOUTHERN UNIVERSITY OF SCIENCE AND TECHNOLOGY, Guangdong (CN)

(72) Inventors: Xinming Shi, Shenzhen (CN); Xin Yao, Shenzhen (CN)

(73) Assignee: SOUTHERN UNIVERSITY OF SCIENCE AND TECHNOLOGY, Shenzhen (CN)

(*) Notice: Subject to any disclaimer, the term of this patent is extended or adjusted under 35 U.S.C. 154(b) by 0 days.

(21) Appl. No.: 17/880,015

(22) Filed: Aug. 3, 2022

(65) Prior Publication Data
US 2022/0414307 A1    Dec. 29, 2022

Related U.S. Application Data

(63) Continuation of application No. PCT/CN2022/080251, filed on Mar. 10, 2022.

(30) Foreign Application Priority Data

Jun. 25, 2021 (CN) .......................... 202110713376.7

(51) Int. Cl.
*G06F 30/367* (2020.01)
*G06F 30/373* (2020.01)
(Continued)

(52) U.S. Cl.
CPC .......... *G06F 30/367* (2020.01); *G06F 30/373* (2020.01); *G06F 30/27* (2020.01);
(Continued)

(58) Field of Classification Search
CPC ...... G06F 30/367; G06F 30/373; G06F 30/38; G06F 30/27; G06F 30/33; G06F 30/337; G06F 30/398
(Continued)

(56) References Cited

U.S. PATENT DOCUMENTS

| 6,597,957 B1 | 7/2003 | Beakley |
| 2008/0103995 A1* | 5/2008 | Mohamed .............. G06N 3/126 706/15 |
| 2020/0097321 A1* | 3/2020 | Le Toquin ............ G06F 9/4843 |

FOREIGN PATENT DOCUMENTS

| CN | 1595904 A | 3/2005 |
| CN | 101689692 A * | 3/2010 ......... G06F 17/5036 |

(Continued)

OTHER PUBLICATIONS

International Search Report dated May 17, 2022 in corresponding International application No. PCT/CN2022/080251; 6 pages.

*Primary Examiner* — Phallaka Kik
(74) *Attorney, Agent, or Firm* — Maier & Maier, PLLC

(57) ABSTRACT

A method, apparatus, computer device, and storage medium for automatic design of analog circuits based on tree structure. The method includes: setting the maximum height and growth direction of the tree structure; randomly calling the node from the function node library as the parent node; randomly calling the node from the function node library and the port node library as the child according to the growth direction node; if the child node is a terminal node, generating a tree structure; checking the tree structure, if the tree structure satisfies the preset conditions, obtaining the circuit topology and device parameter that conform to the circuit rules; evolving the circuit topology and device parameter to generate an analog circuit. The embodiments achieve the effect of making the tree structure of the designed analog circuit more reasonable.

10 Claims, 11 Drawing Sheets

(51) Int. Cl.
  *G06F 30/38*    (2020.01)
  *G06F 30/27*    (2020.01)
  *G06F 30/33*    (2020.01)
  *G06F 30/337*   (2020.01)
  *G06F 30/398*   (2020.01)

(52) U.S. Cl.
  CPC ............ *G06F 30/33* (2020.01); *G06F 30/337* (2020.01); *G06F 30/38* (2020.01); *G06F 30/398* (2020.01)

(58) Field of Classification Search
  USPC ..... 716/111, 106, 132, 136; 703/15; 706/13, 706/48
  See application file for complete search history.

(56)           References Cited

FOREIGN PATENT DOCUMENTS

| CN | 110032182 A   | 7/2019  |            |
|----|---------------|---------|------------|
| CN | 111950215 A   | 11/2020 |            |
| CN | 112182968 A   | 1/2021  |            |
| CN | 113420519 A   | 9/2021  |            |
| CN | 108804762 B * | 4/2022  | G06F 30/20 |
| DE | 112014000125 T5 * | 2/2015 | G06F 30/327 |

* cited by examiner

METHOD, APPARATUS, COMPUTER DEVICE, AND STORAGE MEDIUM FOR AUTOMATIC DESIGN OF ANALOG CIRCUITS BASED ON TREE STRUCTURE

CROSS-REFERENCES TO RELATED APPLICATIONS

This application is a bypass continuation application of PCT application No. PCT/CN2022/080251 filed on Mar. 10, 2022, which claims priority to Chinese patent application No. 202110713376.7 filed on Jun. 25, 2021, the contents of each of the above application are hereby incorporated by reference.

FIELD

The present disclosure relates to the technical field of automatic circuit design, and more particularly, to a method, apparatus, computer device, and storage medium for automatic design of analog circuits based on tree structure.

BACKGROUND

Automatic circuit design has attracted more and more attention. As complex topology and parameter selection are involved, the automation of analog circuit design is particularly challenging. There are various methods to study the automation of analog circuit design, including methods based on domain knowledge, evolutionary algorithm and simulated annealing. The method based on domain knowledge has high demand for circuit knowledge for designers. Simulated annealing method and evolutionary algorithm are widely used in automatic circuit design because they do not rely on domain knowledge. Genetic programming is a kind of evolutionary algorithm. As a global optimization search algorithm, it is simple, universal, robust, and has strong solving ability for modeling nonlinear complex problems. These characteristics coincide with the requirements of analog circuit automatic design, so the genetic programming has been successfully applied to analog circuit automatic design.

For automatic circuit design based on evolutionary algorithm, circuit representation determines the search space of evolutionary algorithm, which plays a key role in both the convergence process and the final result of evolution. For different data structures, circuits representation can be divided into three categories, namely, string-based, tree-based, and graph-based circuit representation methods.

However, it consumes a lot of calculation time to represent the circuit in the form of strings, and the graph-based representation is not conducive to cross-operation. The existing tree-based representation method uses circuit connection operation to design the structure of the tree, which makes the structure of the tree larger.

SUMMARY

The present disclosure provides a method, apparatus, computer device, and storage medium for automatic design of analog circuits based on tree structure, so as to obtain a more reasonable tree structure representing the circuit.

In a first aspect, an embodiment of the present disclosure provides a method for automatic design of analog circuits based on tree structure, as follows:

the method for automatic design of analog circuit based on tree structure comprises:

setting a maximum height and a growth direction of a tree structure;

calling a node randomly from a function node library as a parent node;

calling a node randomly from the function node library and a port node library as a child node according to the growth direction;

generating a tree structure if the child node is a terminal node;

checking the tree structure, and obtaining a circuit topology and a device parameter conforming to circuit rules if the tree structure satisfies preset conditions;

evolving the circuit topology and the device parameter, generating an analog circuit.

Optionally, in the method for automatic design of analog circuits based on tree structure, checking the tree structure comprises at least one of the following:

checking the terminal node of the tree structure to determine whether the terminal node contains all external ports of a predefined embryonic circuit;

checking whether there is a hanging node in the tree structure;

checking whether a height of the tree structure exceeds the maximum height.

Optionally, in the method for automatic design of analog circuit based on tree structure, checking whether there is a hanging node in the tree structure comprises:

checking whether an assigned number of same terminal nodes in the tree structure is greater than or equal to a preset number; there is no hanging node in the tree structure if the assigned number of the same terminal nodes in the tree structure is greater than or equal to the preset number.

Optionally, in the method for automatic design of analog circuits based on tree structure, evolving the circuit topology and the device parameter, generating an analog circuit comprises:

setting population parameter, the population parameter comprising at least a size of the population, a topological structure crossover rate, a value crossover rate, a mutation rate, and a preset iteration times;

initializing the population, and generating population individuals to be evolved according to the size of the population;

evaluating a fitness value of the population individuals;

selecting elite individuals from the population individuals through an elite strategy according to the fitness value;

determining whether to perform an individual topological crossover according to the topological structure crossover rate, and if the individual topological crossover is performed, selecting a first parent individual from the elite individuals through a tournament strategy and the first parent individual crossing with the elite individual;

determining whether to perform an individual value crossover according to the value crossover rate, and if the individual value crossover is performed, selecting a second parent individual from the elite individuals through the tournament strategy and the second parent individual crossing with the elite individual;

determining whether to perform an individual mutation operation according to the mutation rate, and if the individual mutation operation is performed, randomly selecting the operation of adding or deleting nodes;

updating the population and the iteration times;

ending iteration and generating the analog circuit when it is determined that the iteration times is equal to the preset iteration times.

Optionally, in the method for automatic design of analog circuits based on tree structure, before setting the maximum height and growth direction of the tree structure further comprises:

determining the function node library and the port node library;

predefining an embryonic circuit.

Optionally, in the method for automatic design of analog circuits based on tree structure, further comprises:

generating a netlist according to the tree structure;

simulating by using the netlist to obtain an output curve of the analog circuit.

In a second aspect, an embodiment of the present disclosure also provides an apparatus for automatic design of analog circuits based on tree structure, which comprises:

a parameter setting module, configured to set a maximum height and a growth direction of a tree structure;

a parent node determination module, configured to call a node randomly from a function node library as a parent node;

a child node determination module, configured to call a node randomly from the function node library and a port node library as a child node according to the growth direction;

a tree structure generation module, configured to generate a tree structure when it is determined that the child node is a terminal node;

a tree structure checking module, configured to check the tree structure;

a circuit topology and device parameter generation module, configured to obtain a circuit topology and a device parameter conforming to circuit rules if the tree structure satisfies preset conditions;

an analog circuit generation module, configured to evolve the circuit topology and the device parameter, to generate an analog circuit.

Optionally, in the apparatus for automatic design of analog circuits based on tree structure, the tree structure checking module comprises at least one of the following:

a terminal node checking unit, configured to check the terminal node of the tree structure to determine whether the terminal node contains all external ports of a predefined embryonic circuit;

a hanging node checking unit, configured to check whether there is a hanging node in the tree structure;

a tree structure height checking unit, configured to check whether a height of the tree structure exceeds the maximum height.

In a third aspect, an embodiment of the present disclosure further provides a computer device for automatic design of analog circuits based on tree structure, which comprises:

a processor, configured to realize the method for automatic design of analog circuits based on tree structure according to any of the first aspect when executing a computer program.

In a fourth aspect, an embodiment of the present disclosure further provides a computer readable storage medium storing a computer program, which realizes the method for automatic design of analog circuits based on tree structure according to any of the first aspect when the computer program is executed by a processor.

The disclosure determines the maximum allowable height and growth direction of the tree structure by setting the maximum height and growth direction of the tree structure. The function node library contains the device type and device parameter required to generate the analog circuit, and the port node library contains the port location of the device required to generate the analog circuit. Node is called randomly from the function node library as the parent node; and another node is called randomly from the function node library and the port node library as the child node according to the growth direction. If the data type of the child node is determined that the child node is the terminal node, the tree growth ends and the tree structure is generated. If the child node is not the terminal node, continue to randomly call the node from the function node library and port node library as the child node according to the growth direction until the child node is the terminal node. Thus, the growth of each branch of the tree structure is completed, and the tree structure is generated. Then, the tree structure is checked, and if the tree structure satisfies the preset conditions, it indicates that the generated tree structure complies with the circuit rules, thereby circuit topology and device parameter that comply with the circuit rules are obtained. Compared with the tree structure generated by the circuit connection operation in the prior art, the present disclosure directly uses the device type as the function node. The tree structure of the circuit topology generated by taking the port position of the device as the terminal node is smaller, and the tree structure is more reasonable, which is convenient for the subsequent evolution and the generation of the netlist. Finally, the circuit topology and device parameter are evolved to generate an analog circuit. The disclosure solves the problem of using circuit connection operation to design the tree structure in the prior art would lead to a larger tree structure, and achieves the effect of making the designed tree structure of the analog circuits more reasonable.

DETAILED DESCRIPTION OF THE EMBODIMENTS

The present disclosure is further described in detail below in conjunction with the accompanying drawings and embodiments. It should be understood that the embodiments described herein are only used to explain the present disclosure, but not to limit the present disclosure. In addition, it should be noted that, for the convenience of description, the drawings only show some but not all structures related to the present disclosure.

Figure 1:
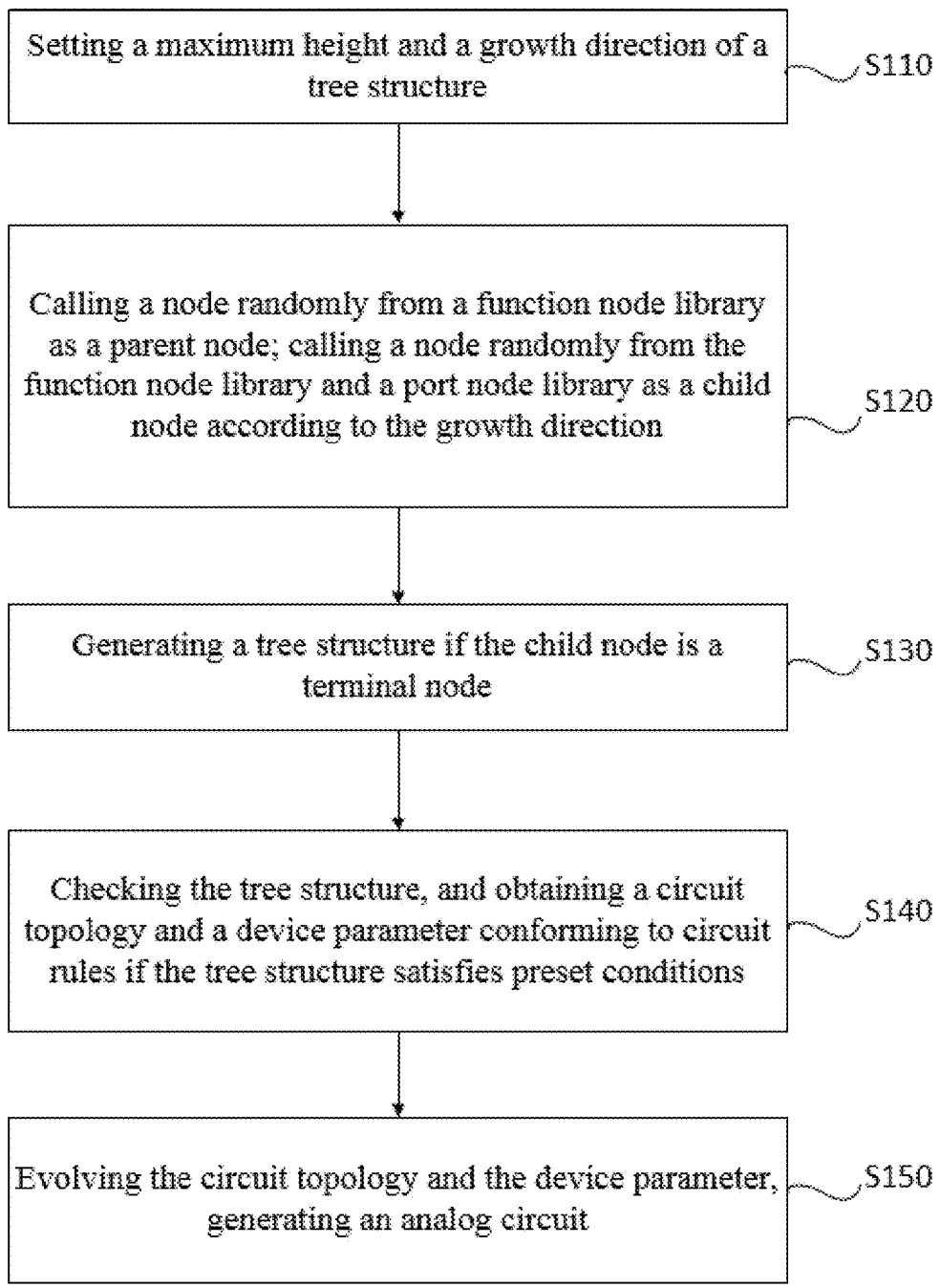
FIG. 1 illustrates a flowchart of a method for automatic design of analog circuits based on tree structure in an embodiment of the present disclosure.

FIG. 1 illustrates a flowchart of a method for automatic design of analog circuits based on tree structure in the embodiment of the present disclosure. The embodiment is applicable to the situation of automatic design of analog circuits based on tree structure. As shown in FIG. 1, the method for automatic design of analog circuit based on tree structure comprises:

S110, setting a maximum height and a growth direction of a tree structure.

The tree is an important nonlinear data structure. Intuitively, it is a structure in which data elements (called nodes in the tree) are organized according to branch relationships. The tree structure is, for example, a multi-fork tree structure. Before generating the tree structure, first set the maximum height and growth direction of the tree structure, the maximum height refers to the maximum allowable height of the tree structure, and for example, the growth direction is set downward.

Figure 2:
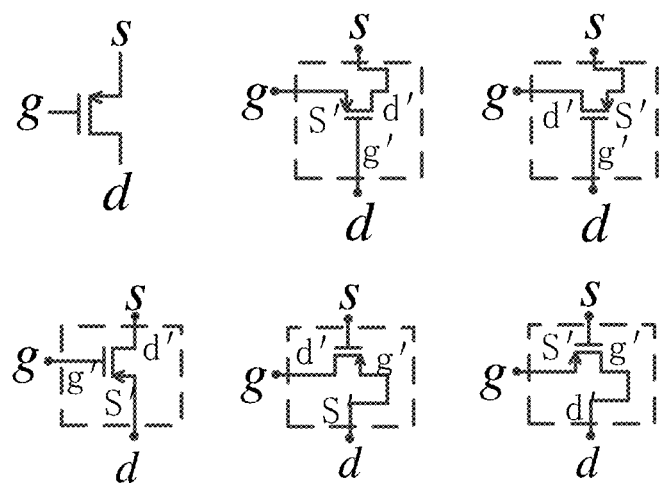
FIG. 2 illustrates a schematic of equivalent transistors defined by different ports in an embodiment of the present disclosure.

S120, calling a node randomly from a function node library as a parent node; calling a node randomly from the function node library and a port node library as a child node according to the growth direction;

The function node library contains all function nodes required to generate the analog circuit. The function node includes device type and device parameter. The device parameter can include arithmetic operators and floating-point numbers. The floating-point number is a number from −1 to 1. The port node library contains all port nodes needed to generate the analog circuit, namely the port position of the apparatus, and the port position of the apparatus is represented by an integer. A node is randomly called from the function node library as the parent node, and then another node is randomly called from the function node library and the port node library as the child node according to the growth direction. It should be noted that apparatus with polarity can be represented by different function nodes, such as memristors or transistors, etc. FIG. 2 is a schematic of equivalent transistors defined by different ports in the embodiment of the present disclosure and shows 6 types of transistors defined by different ports. These 6 types of transistors need to be represented by different function nodes to distinguish them. In FIG. 2, g' represents the gate of the transistor, s' represents the source of the transistor, d' represents the drain of the transistor, and g, s, and d represent three port nodes of the transistor, respectively.

S130, generating a tree structure if the child node is a terminal node.

Specifically, determine the data type of the child node. If the child node is a digital type, the child node is the terminal node, then the tree growth ends and the tree structure is generated. If the data type of the child node is not a digital type, continue to randomly call the node from the function node library and the port node library as the child node according to the growth direction until the child node is the terminal node. Thus, the growth of each branch of the tree structure is completed, and the tree structure is generated. The tree structure of circuit topology can be generated by using the device type of the function node library and the device port position of the port node library, and the tree structure of device parameter can be generated by using the device parameter of the function node library.

S140, checking the tree structure, and obtaining a circuit topology and a device parameter conforming to circuit rules if the tree structure satisfies preset conditions.

Specifically, check the tree structure, and if the tree structure satisfies the preset conditions, it indicates that the generated tree structure conforms to the circuit rules, so as to obtain the circuit topology and device parameter that conform to the circuit rules. Compared with the tree structure generated by the circuit connection operation in the prior art, the embodiment of the present disclosure directly uses the device type as the function node. The tree structure of the circuit topology generated by taking the port position of the device as the terminal node is smaller, and the tree structure is more reasonable, which is convenient for the subsequent evolution and the generation of the netlist. The preset conditions may be determined according to actual conditions, for example, according to circuit rules. The connection relationship of the circuit can be determined through the circuit topology, and the parameter values of each device can be calculated through the device parameter. The calculation formula of the parameter value is $Value_{device} = A \times (10^{Value_{tree}})$, in which A is an adjustable parameter which can be set according to the actual situation, $Value_{device}$ is the device parameter value, $Value_{tree}$ is the value calculated according to the tree structure of the device parameter.

Figure 3:
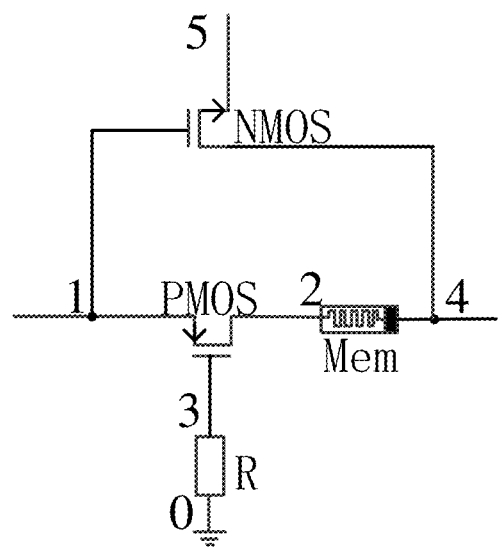
FIG. 3 illustrates a schematic diagram of the circuit structure in an embodiment of the present disclosure.
Figure 4:
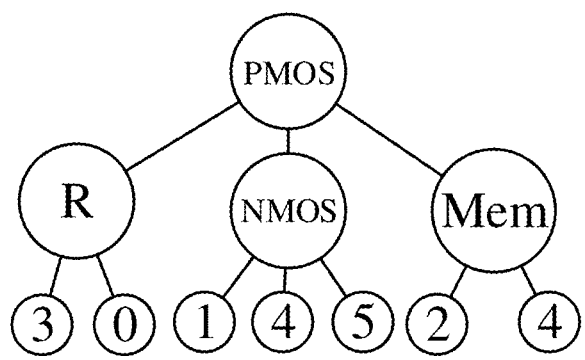
FIG. 4 illustrates a schematic diagram of the circuit topology corresponding to FIG. 3 generated by utilizing the method for automatic design of analog circuits based on tree structure in an embodiment of the present disclosure.
Figure 5:
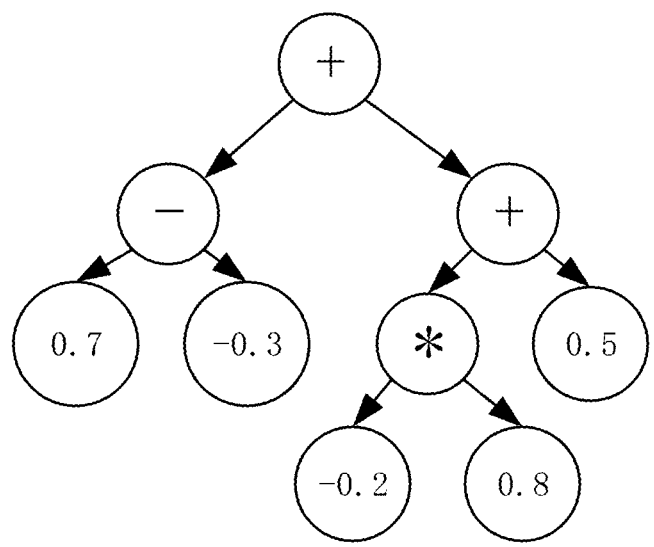
FIG. 5 illustrates a schematic diagram of the device parameter corresponding to FIG. 3 generated by utilizing the method for automatic design of analog circuits based on tree structure in an embodiment of the present disclosure.

FIG. 3 illustrates a schematic diagram of the circuit structure in an embodiment of the present disclosure, FIG. 4 illustrates a schematic diagram of the circuit topology corresponding to FIG. 3 generated by utilizing the method for automatic design of analog circuit based on tree structure in the embodiment of the present disclosure, FIG. 5 illustrates a schematic diagram of the device parameter corresponding to FIG. 3 generated by utilizing the method for automatic design of analog circuit based on tree structure in the embodiment of the present disclosure. Referring to FIG. 3, the circuit includes a first transistor PMOS, a resistor R, a second transistor NMOS and a memristor Mem, the resistor R includes port nodes 0 and 3, the first transistor PMOS includes port nodes 1, 2 and 3, and the second transistor NMOS includes port nodes 1, 4 and 5, memristor Mem includes port nodes 2 and 4, the port node of the device can represent the port position of the device. Referring to FIG. 4, the circuit topology takes the first transistor PMOS as the parent node, the resistor R, the second transistor NMOS, and the memristor Mem as the child nodes, and takes the port positions of the resistor R, the second transistor NMOS, and the memristor Mem as the terminal node. Referring to FIG. 5, FIG. 5 can be the device parameter corresponding to any device in FIG. 3. The device parameter includes arithmetic operators and floating-point numbers. Referring to FIG. 5, the arithmetic operators include two "+", one "−" and one "*", where "+" represents the addition operator, "−" represents the subtraction operator, "*" represents the multiplication operator, and floating-point numbers include 0.7, −0.3, −0.2, 0.8, and 0.5. According to FIG. 5, $Value_{tree}$ can be calculated that, $Value_{tree}=(0.7-(-0.3))-(-0.2)*0.8-0.5)=1.34$, therefore, by setting A, the parameter value of the device can be calculated, thereby determining the parameter value of each device. It should be noted that FIG. 4 only illustrates a situation of the circuit topology, and does not limit it; FIG. 5 only illustrates a situation of device parameter, and does not limit it.

S150, evolving the circuit topology and the device parameter, generating an analog circuit.

Specifically, the generated circuit topology may not be the optimal connection method, the connection may be disordered, and the generated device parameter may not be optimal device parameter values, so it is necessary to evolve the circuit topology and device parameter. For example, the genetic algorithm is used for evolution, and finally an analog circuit is generated. At this time, the connection mode and device parameter of the generated analog circuit are more reasonable.

The technical solution of this embodiment, determines the maximum allowable height and growth direction of the tree structure by setting the maximum height and growth direction of the tree structure. The function node library contains device type and device parameter required to generate the analog circuit, and the port node library contains port location of the device required to generate the analog circuit. A node is called randomly from the function node library as the parent node; another node is called randomly from the function node library and the port node library as the child node according to the growth direction. And if the data type of the child node is determined that the child node is the terminal node, the tree growth ends and the tree structure is generated. If the child node is not the terminal node, continue to randomly call the node from the function node library and port node library as the child node according to the growth direction until the child node is the terminal node. Thus, the growth of each branch of the tree structure is completed, and the tree structure is generated. Then, the tree structure is checked, and if the tree structure satisfies the preset conditions, it indicates that the generated tree structure complies with the circuit rules, thereby obtaining circuit topology and device parameter that comply with the circuit rules. Compared with the tree structure generated by the circuit connection operation in the prior art, the embodiment of the present disclosure directly uses the device type as the function node. The tree structure of the circuit topology generated by taking the port position of the device as the terminal node is smaller, and the tree structure is more reasonable, which is convenient for the subsequent evolution and the generation of the netlist. Finally, the circuit topology and device parameter are evolved to generate an analog circuit. The disclosure solves the problem of using circuit connection operation to design the tree structure in the prior art to make the tree structure larger, and achieves the effect of making the designed tree structure of the analog circuit more reasonable.

On the basis of the above embodiment, in S140, checking the tree structure comprises at least one of the following:

checking the terminal node of the tree structure to determine whether the terminal node contains all external ports of a predefined embryonic circuit.

The embryonic circuit represents an initial circuit configuration of the circuit to be evolved, which is predefined and will be fixed during evolution. A typical embryonic circuit includes voltage sources, ground and load resistors, etc., and this part of the analog circuit will not be evolved. Specifically, check the terminal nodes of the tree structure to determine whether the terminal nodes of the tree structure include all external ports of the embryonic circuit, that is, check whether the terminal nodes of the tree structure are connected to all external ports of the embryonic circuit. This avoids unconnected ports in embryonic circuits, avoids hanging nodes in subsequently generated embryonic circuits, and avoids invalid circuits during evolution.

Checking whether there is a hanging node in the tree structure.

Specifically, check whether there is a hanging node in the tree structure, that is, check whether the ports of the devices in the tree structure are all connected to the circuit, so as to avoid open circuit in the generated analog circuit, which will cause the analog circuit to fail to work normally.

Optionally, checking whether there is a hanging node in the tree structure comprises:

checking whether an assigned number of same terminal nodes in the tree structure is greater than or equal to a preset number; there is no hanging node in the tree structure if the assigned number of the same terminal nodes in the tree structure is greater than or equal to the preset number.

Specifically, checking whether there is a hanging node in the tree structure may be checking the assigned times of the same terminal node of the tree structure, that is, checking a number of occurrences of the same terminal nodes of the tree structure, if the assigned times of the same terminal node is greater than or equal to the preset number of times, it proves that the terminal nodes of the tree structure are all connected, and there is no unconnected terminal node, that is, there is no hanging node, so as to ensure that the generated analog circuit does not have an open circuit phenomenon. The preset number of times may be determined according to specific device types and device connection relationships, and the preset number of times may be 2 or 3, which is not limited here.

Checking whether a height of the tree structure exceeds the maximum height.

Specifically, the height of the tree structure is checked to prevent the height of the tree structure from exceeding the maximum height, so as to avoid the expansion phenomenon of the tree structure, thereby preventing the generated tree structure from being too large and making the tree structure more reasonable. Optionally, if the height of the tree structure exceeds the maximum height, the excess part can be replaced with its left terminal node, so that the tree structure grows to the terminal node in advance and the height of the tree structure is reduced.

Figure 6:
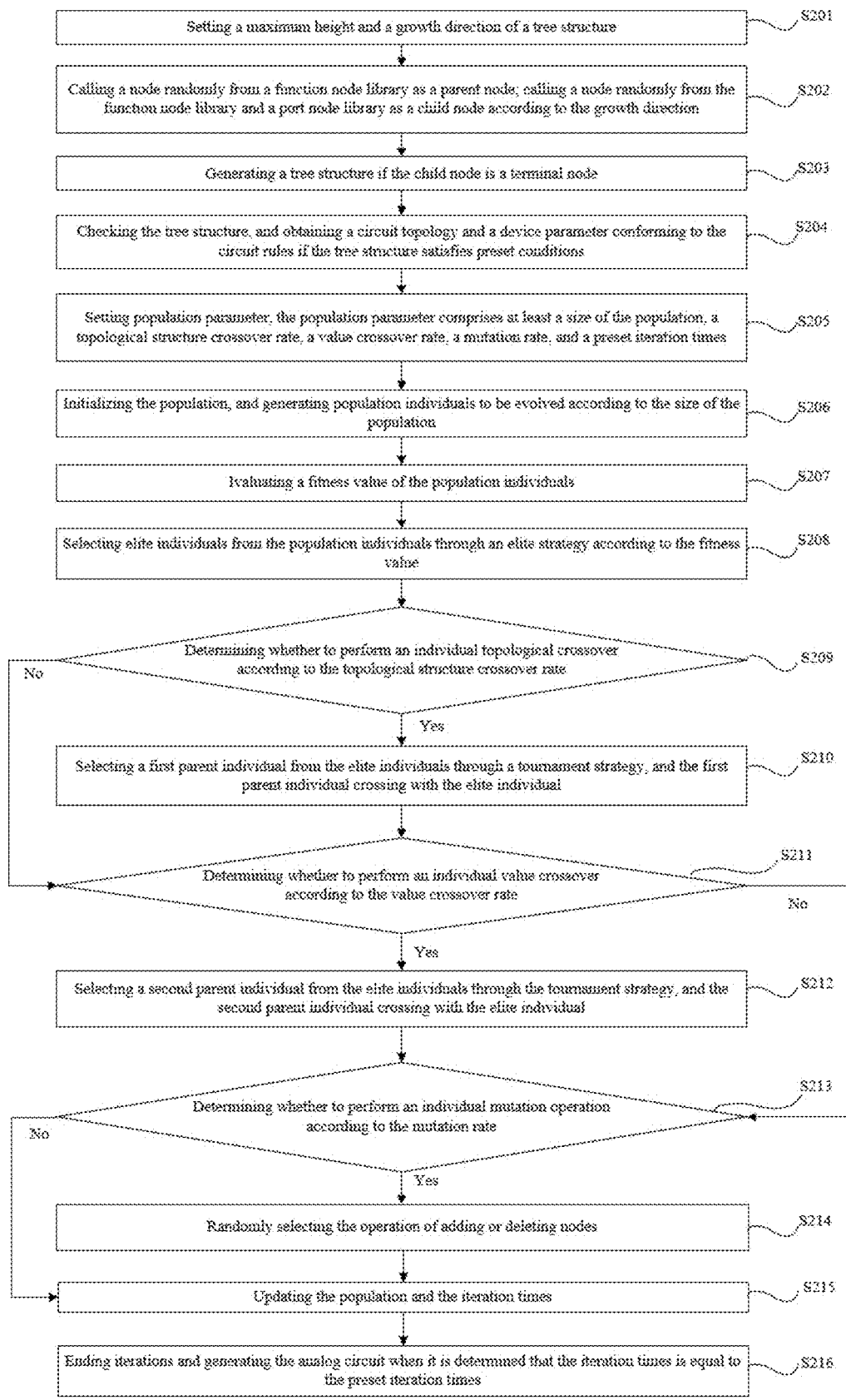
FIG. 6 illustrates a flowchart of another method for automatic design of analog circuits based on tree structure in an embodiment of the present disclosure.

On the basis of the above technical solution, FIG. 6 is a flowchart of another method for automatic design of analog circuits based on tree structure in an embodiment of the present disclosure. Optionally, referring to FIG. 6, the method for automatic design of analog circuits based on tree structure comprises:

S201, setting a maximum height and a growth direction of a tree structure.

S202, calling a node randomly from a function node library as a parent node; calling a node randomly from the function node library and a port node library as a child node according to the growth direction.

S203, generating a tree structure if the child node is a terminal node.

S204, checking the tree structure, and obtaining a circuit topology and a device parameter conforming to the circuit rules if the tree structure satisfies preset conditions.

S205, setting population parameter, the population parameter comprises at least a size of the population, a topological structure crossover rate, a value crossover rate, a mutation rate, and a preset iteration times.

Specifically, first set the parameter of the population, the size of the population is the number of individuals in the population; The topological structure crossover rate refers to the crossover rate of the topology structure, and can be set randomly or calculated according to the formula, which is not limited here; The value crossover rate refers to the crossover rate of the tree structure of the device parameter, and can be set randomly or calculated according to the formula, which is not limited here; The mutation rate can be set randomly or calculated according to the formula, which is not limited here; The preset iteration times the number of iterations that the population needs, and can be determined according to the actual situation, for example, it can be determined according to the evolution time or other conditions, which is not limited here.

S206, initializing the population, and generating population individuals to be evolved according to the size of the population.

Specifically, initializing the population, the initialization methods include class M random method, fixed value setting method, two-step method, hybrid method and specific application method. The specific initialization method can be selected according to the actual needs. According to the size of the population to generate population individuals for subsequent evolution.

S207, evaluating a fitness value of the population individuals.

Specifically, fitness value refers to the relative ability of an individual with a known genotype to transmit its genes to the gene pool of its offspring under certain environmental conditions, and is a measure of the individual's chances of survival and reproduction. Calculate the fitness value of the individuals in the population, evaluate the individuals in each population, judge the pros and cons of each individual in the population, and facilitate the subsequent selection of individuals in the population.

S208, selecting elite individuals from the population individuals through an elite strategy according to the fitness value.

Specifically, the elite strategy is to directly copy the best individuals (called elite individuals) that have appeared so far in the evolution process to the next generation without pairing and crossover. Select the individual with the best fitness value from the population individuals, so as to select the elite individual, and there can be multiple elite individuals.

S209, determining whether to perform an individual topological crossover according to the topological structure crossover rate, if the individual topological crossover is performed, performing S210, selecting a first parent individual from the elite individuals through a tournament strategy, and the first parent individual crossing with the elite individual; if the individual topological crossover is not performed, performing S211 directly.

Specifically, generate a random number from 0 to 1, and compare the random number with the topological crossover rate, if the random number is less than the topological crossover rate, then perform the individual topological crossover. Select a first parent individual from the elite individuals through a tournament strategy, and the first parent individual crossing with the elite individual. Wherein, the tournament strategy is to take out a certain number of individuals from the population each time (replacement sampling), and then select the best one to enter the descendant population, and repeat this operation until the new population size reaches the original population size. A few-element tournament is to take out several individuals from the population at one time, and then take out the best individual among these individuals and put it into the set reserved for the next generation population. The tournament strategy may be, for example, an n-ary tournament strategy, and the specific value of n may be determined according to actual requirements, which is not limited here.

S211, determining whether to perform an individual value crossover according to the value crossover rate, if the individual value crossover is performed, performing S212, selecting a second parent individual from the elite individuals through the tournament strategy, and the second parent individual crossing with the elite individual; if the individual value crossover is not performed, performing S213 directly.

Specifically, the value crossover rate is the crossover rate of the device parameter, generate a random number from 0 to 1, and compare the random number with the value crossing rate, if the random number is less than the value crossing rate, then perform the individual value crossover. Select a second parent individual from the elite individuals through the tournament strategy, and the second parent individual crossing with the elite individual.

S213, determining whether to perform an individual mutation operation according to the mutation rate, if the individual mutation operation is performed, performing S214, randomly selecting the operation of adding or deleting nodes. If the individual mutation operation is not performed, performing S215 directly.

Specifically, generate a random number from 0 to 1, and compare the random number with the mutation rate, if the random number is less than the mutation rate, then perform the individual mutation operation. Randomly select the operation of adding or deleting nodes, that is, adding nodes or deleting nodes, which can be randomly selected.

S215, updating the population and the iteration times.

Specifically, after the population individual mutates, the population is updated, and the iteration times is updated, that is, after each iteration, the iteration times is increased by 1, thereby recording the iteration times in real time.

S216, ending iterations and generating the analog circuit when it is determined that the iteration times is equal to the preset iteration times.

Specifically, the iteration is continuously performed until a number of the iteration times is equal to the preset iteration number, the iteration ends, and the evolution is completed, and the analog circuit can be generated. The connection relationship of the analog circuit generated by evolution is more reasonable, the connection is not complicated, and the values of the device parameter after the evolution are more reasonable, so that a reasonable analog circuit can be obtained.

Figure 7:
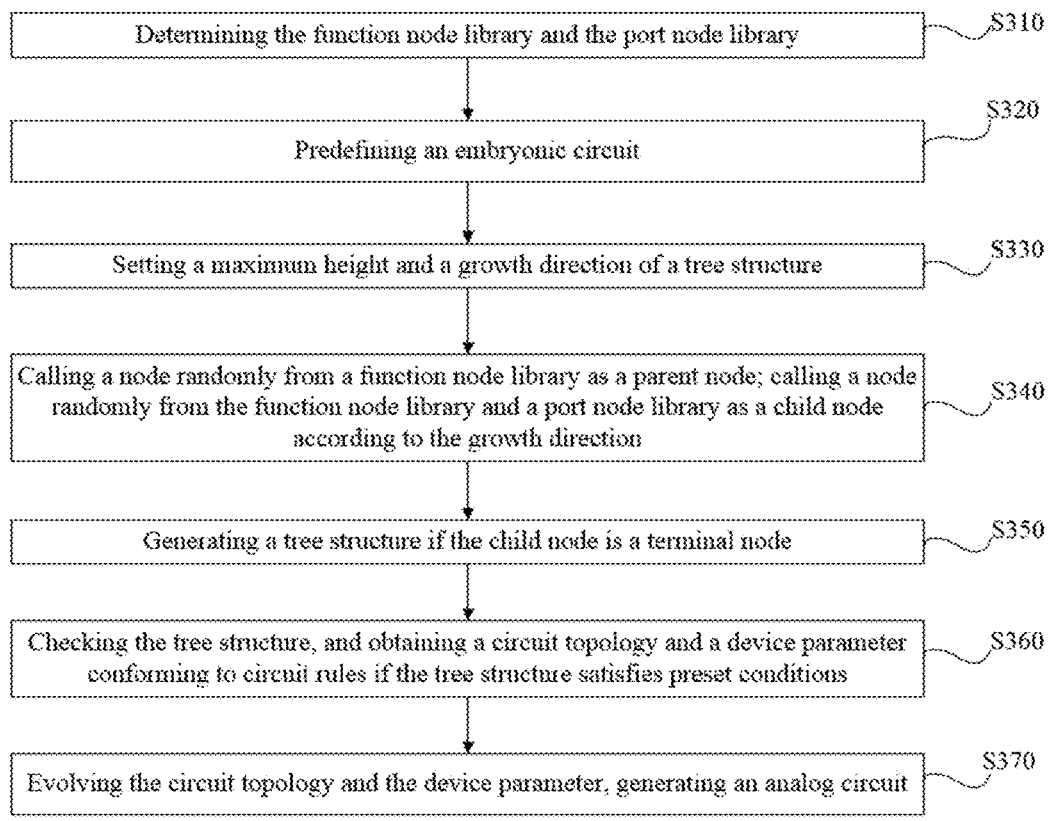
FIG. 7 illustrates a flowchart of another method for automatic design of analog circuits based on tree structure in the embodiment of an present disclosure.

On the basis of the above technical solution, FIG. 7 is a flowchart of another method for automatic design of analog circuits based on tree structure in an embodiment of the present disclosure. Optionally, referring to FIG. 7, the method for automatic design of analog circuits based on tree structure comprising:

S310, determining the function node library and the port node library.

Specifically, according to the analog circuit to be designed, determine all required device types and device parameter, the device parameter can include arithmetic operators and floating-point numbers, define the function node library, and put all the device types and device parameter into the function node library. Define the port node library, number the port positions of all the devices, and put the port position numbers of the devices into the port node library.

S320, predefining an embryonic circuit.

Specifically, according to the analog circuit to be designed, the required voltage source, ground and load resistance are determined, and the required voltage source, ground and load resistance are formed into an embryonic circuit, and the embryonic circuit can represent the initial circuit configuration of the circuit to be evolved.

S330, setting a maximum height and a growth direction of a tree structure.

S340, calling a node randomly from a function node library as a parent node; calling a node randomly from the function node library and a port node library as a child node according to the growth direction.

S350, generating a tree structure if the child node is a terminal node.

S360, checking the tree structure, and obtaining a circuit topology and a device parameter conforming to circuit rules if the tree structure satisfies preset conditions.

S370, evolving the circuit topology and the device parameter, generating an analog circuit.

Figure 8:
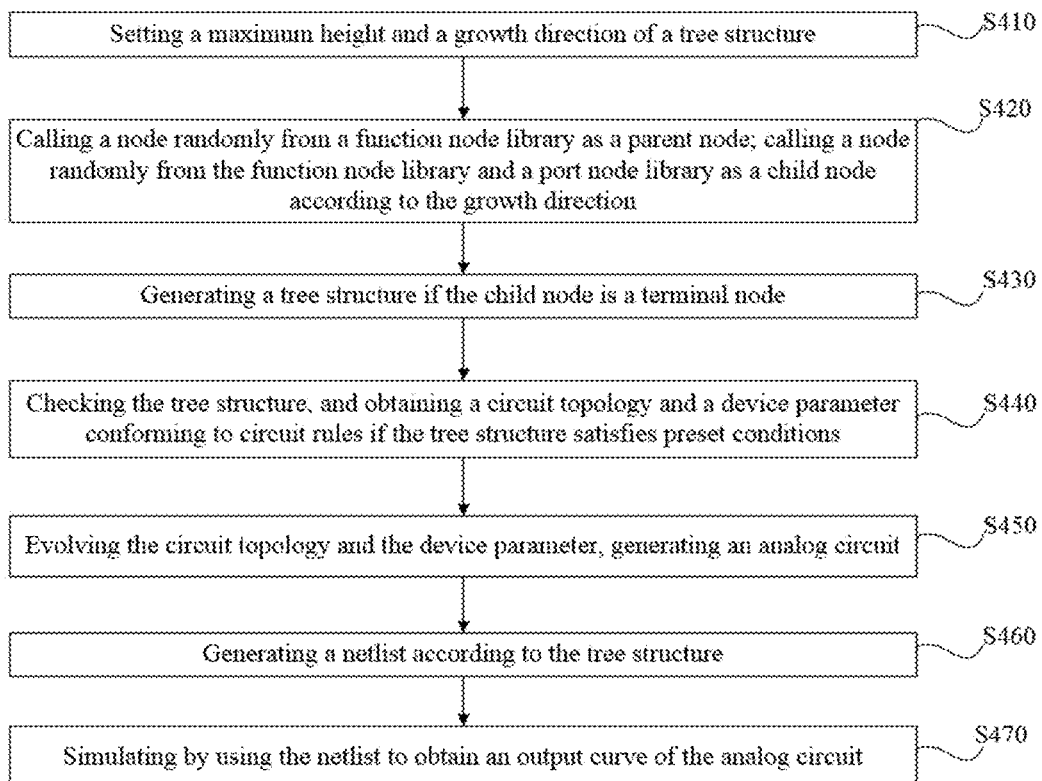
FIG. 8 illustrates a flowchart of another method for automatic design of analog circuits based on tree structure in an embodiment of the present disclosure.

On the basis of the above technical solution, FIG. 8 is a flowchart of another method for automatic design of analog circuit based on tree structure in the embodiment of the present disclosure. Optionally, referring to FIG. 8, the method for automatic design of analog circuits based on tree structure comprising:

S410, setting a maximum height and a growth direction of a tree structure.

S420, calling a node randomly from a function node library as a parent node; calling a node randomly from the function node library and a port node library as a child node according to the growth direction.

S430, generating a tree structure if the child node is a terminal node.

S440, checking the tree structure, and obtaining a circuit topology and a device parameter conforming to circuit rules if the tree structure satisfies preset conditions.

S450, evolving the circuit topology and the device parameter, generating an analog circuit.

S460, generating a netlist according to the tree structure.

Specifically, a netlist is generated according to the generated circuit topology and the tree structure of device parameter, and the netlist is, for example, a SPICE netlist. Table.1 is the netlist corresponding to FIG. 4 generated by the method for automatic design of analog circuit based on tree structure. Referring to Table 1, the netlist includes the device type and the port position of the device. Referring to FIG. 4, the tree structure also includes the device type and the port position of the device, so the tree structure of the embodiment of the present disclosure is in one-to-one correspondence with the netlist, therefore, the time for converting the tree structure into a netlist can be reduced, the time complexity of the conversion is small, and the conversion efficiency can be improved. Therefore, even if a three-port device is defined, the tree structure and netlist can be quickly converted, instead of only defining a two-port device in order to improve the conversion efficiency in the prior art. Therefore, the tree structure of the embodiment of the present disclosure can be applicable to two-port devices, can also be applied to three-port devices.

TABLE 1

Netlist corresponding to FIG. 4 generated by the method for automatic design of analog circuits based on tree structure S470, simulating by using the netlist to obtain an output curve of the analog circuit.

| Device | Port | | |
|---|---|---|---|
| | Port1 | Port2 | Port3 |
| PMOS | 3 | 1 | 2 |
| R | 3 | 0 | — |
| NMOS | 1 | 4 | 5 |
| Mem | 2 | 4 | — |

Specifically, using the netlist for simulation, the output curve of the analog circuit can be obtained. By comparing the output curve of the analog circuit with the target curve of the analog circuit, the simulation generated by the method for automatic design of the analog circuits based on the tree structure can be obtained if the circuit is suitable, so as to ensure a reasonable analog circuit.

Figure 9:
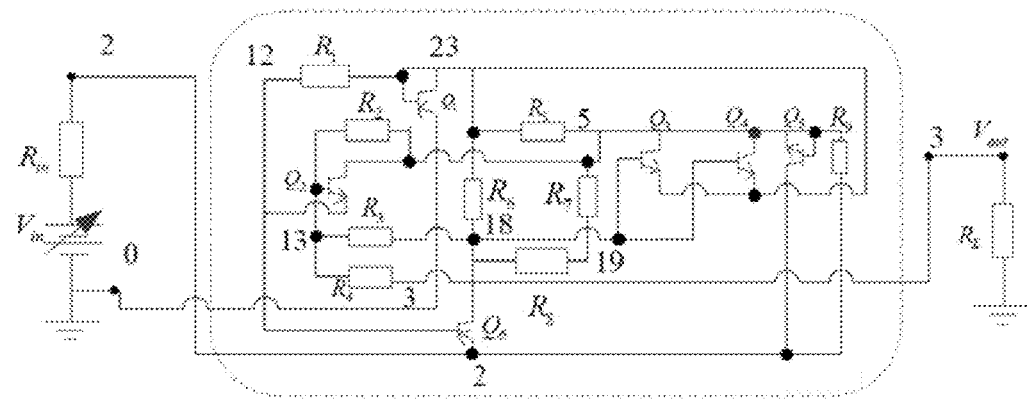
FIG. 9 illustrates a schematic structural diagram of a voltage reference circuit generated by utilizing the method for automatic design of analog circuits based on tree structure in an embodiment of the present disclosure.
Figure 10:
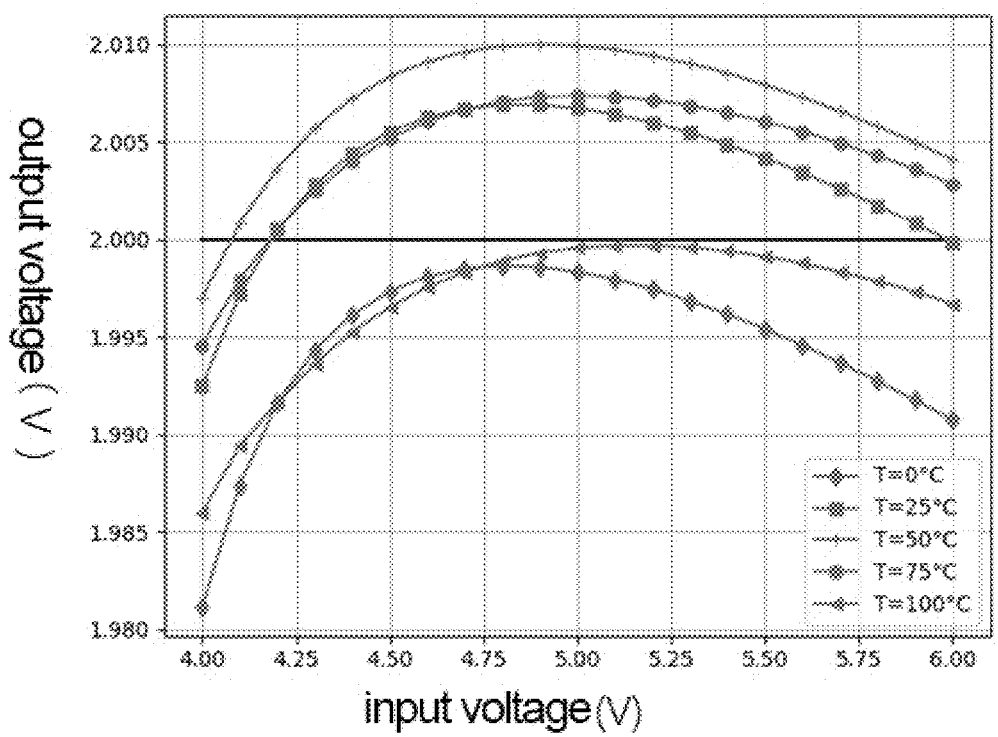
FIG. 10 illustrates a comparison diagram of an output curve and target curve corresponding to FIG. 9 obtained by a netlist simulation generated by utilizing the method for automatic design of analog circuits based on tree structure in an embodiment of the present disclosure.

For example, FIG. 9 is a schematic structural diagram of a voltage reference circuit generated by utilizing the method for automatic design of analog circuit based on tree structure in the embodiment of the present disclosure, FIG. 10 is a comparison diagram of an output curve and target curve corresponding to FIG. 9 obtained by a netlist simulation generated by utilizing the method for automatic design of analog circuit based on tree structure in the embodiment of the present disclosure. Referring to FIG. 9, the voltage reference circuit generated by the method for automatic design of analog circuit based on tree structure includes 15 devices, wherein the resistors include $R_1$, $R_2$, $R_3$, $R_4$, $R_5$, $R_6$, $R_7$, $R_8$ and $R_9$, and the transistors include $Q_1$, $Q_2$, $Q_3$, $Q_4$, $Q_5$ and $Q_6$, the port nodes in the voltage reference circuit include 0, 2, 3, 5, 12, 13, 18, 19 and 23, and the port nodes in the voltage reference circuit are the terminal nodes in the circuit topology, and $R_{in}$ and $R_L$ can be devices in embryonic circuits. Referring to FIG. 9, the voltage $V_{out}$ can be output at the port node 3 by inputting the voltage $V_{in}$ through the port node 0. The resistance value of the resistor can be obtained according to the tree structure of the device parameter, for example, $R_1=16954.5\Omega$, $R_2=461.2\Omega$, $R_3=200000\Omega$, $R_4=7.2\Omega$, $R_5=13757.5\Omega$, $R_6=382.6\Omega$, $R_7=6057.7\Omega$, $R_8=2357.2\Omega$ and $R_9=2.7\Omega$, here is only a situation of the resistance parameter value, and it is not limited. As shown in FIG. 9, the connection of the voltage reference circuit generated by the method for automatic design of the analog circuit based on the tree structure is reasonable, and there is no disorderly connection and no hanging nodes, and the parameter values of each device are also obtained, and The number of generated devices is 15, and the number of devices is also very reasonable. There are no redundant devices, which can reduce the power consumption of the circuit. Referring to FIG. 10, the output curves of the voltage reference circuit at different temperatures are close to the target curve, so the rationality of the voltage reference circuit generated by the method for automatic design of analog circuit based on tree structure is verified.

Figure 11:
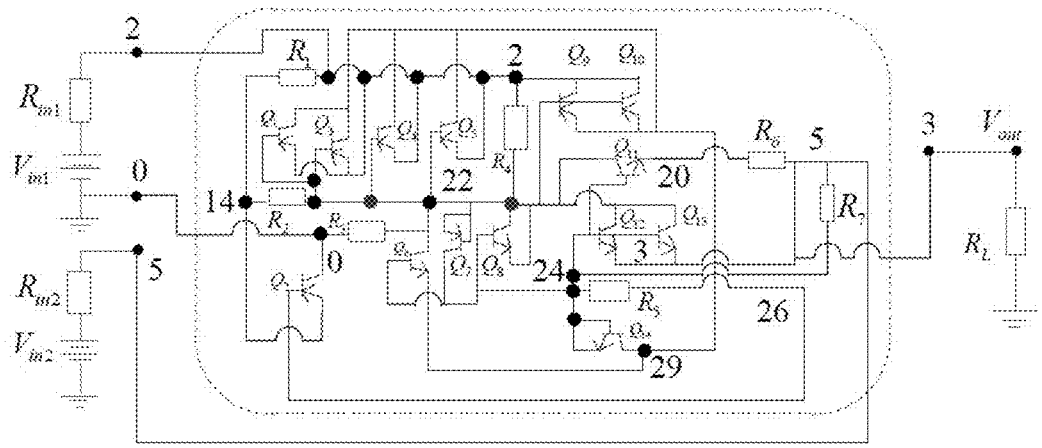
FIG. 11 illustrates a schematic structural diagram of a temperature sensor circuit generated by utilizing the method for automatic design of analog circuits based on tree structure in an embodiment of the present disclosure.
Figure 12:
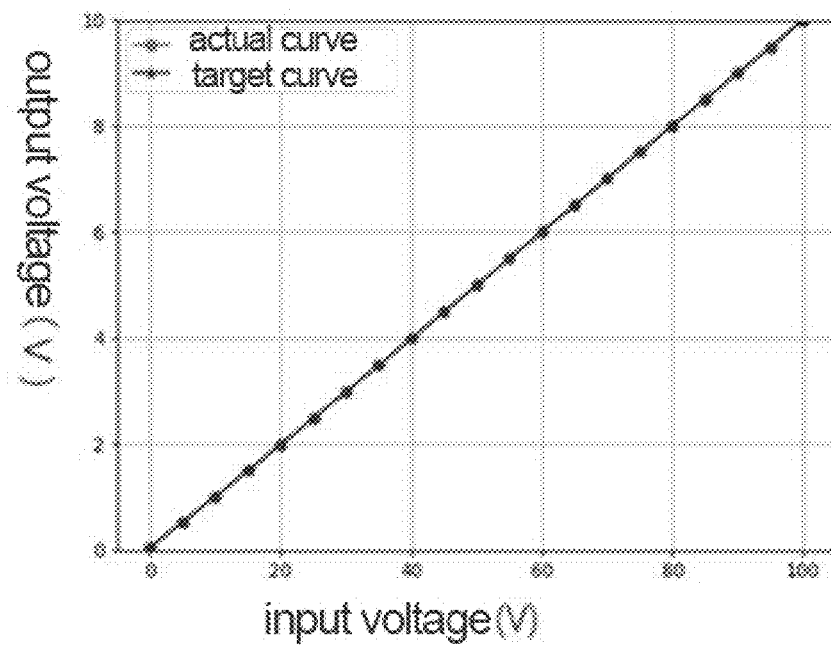
FIG. 12 illustrates a comparison diagram of an output curve and target curve corresponding to FIG. 11 obtained by a netlist simulation generated by utilizing the method for automatic design of analog circuits based on tree structure in an embodiment of the present disclosure.

For example, FIG. 11 is a schematic structural diagram of a temperature sensor circuit generated by utilizing the method for automatic design of analog circuit based on tree structure in the embodiment of the present disclosure, FIG. 12 is a comparison diagram of an output curve and target curve corresponding to FIG. 11 obtained by a netlist simulation generated by utilizing the method for automatic design of analog circuit based on tree structure in the embodiment of the present disclosure. Referring to FIG. 11, the temperature sensor circuit generated by the method for automatic design of analog circuit based on tree structure contains 21 devices, wherein the resistors include $R_1$, $R_2$, $R_3$, $R_4$, $R_5$, $R_6$ and $R_7$, and the transistors include $Q_1$, $Q_2$, $Q_3$, $Q_4$, $Q_5$, $Q_6$, $Q_7$, $Q_8$, $Q_9$, $Q_{10}$, $Q_{11}$, $Q_{12}$, $Q_{13}$, and $Q_{14}$, the port nodes in the temperature sensor circuit include 0, 2, 3, 5, 14, 20, 22, 24, 26, and 29, and the port nodes in the temperature sensor circuit are the terminal nodes in the circuit topology, and $R_{in1}$, $R_{in2}$ and $R_L$ can be devices in the embryonic circuit. Referring to FIG. 11, by inputting the voltages $V_{in1}$ and $V_{in2}$, the voltage $V_{out}$ can be output at the port node 3. The resistance value of the resistor can be obtained according to the tree structure of the device parameter, for example, $R_1=1565.3\Omega$, $R_2=6.9\Omega$, $R_3=18985.9\Omega$, $R_4=50.5\Omega$, $R_5=200000\Omega$, $R_6=6617.2\Omega$ and $R_7=127614.9\Omega$, here is only one example of the resistance parameter value is shown, and it is not limited. Referring to FIG. 11, the connection of the temperature sensor circuit generated by the method for automatic design of analog circuit based on tree structure is reasonable, there is no disorderly connection, and there is no hanging node, and the parameter values of each device are also obtained, and the generated The number of devices is 21, and the number of devices is also very reasonable. There are no redundant devices, which can reduce the power consumption of the circuit. Referring to FIG. 12, the output curve of the temperature sensor circuit almost overlaps with the target curve, so the rationality of the temperature sensor circuit generated by the method for automatic design of analog circuit based on tree structure is verified.

Figure 13:
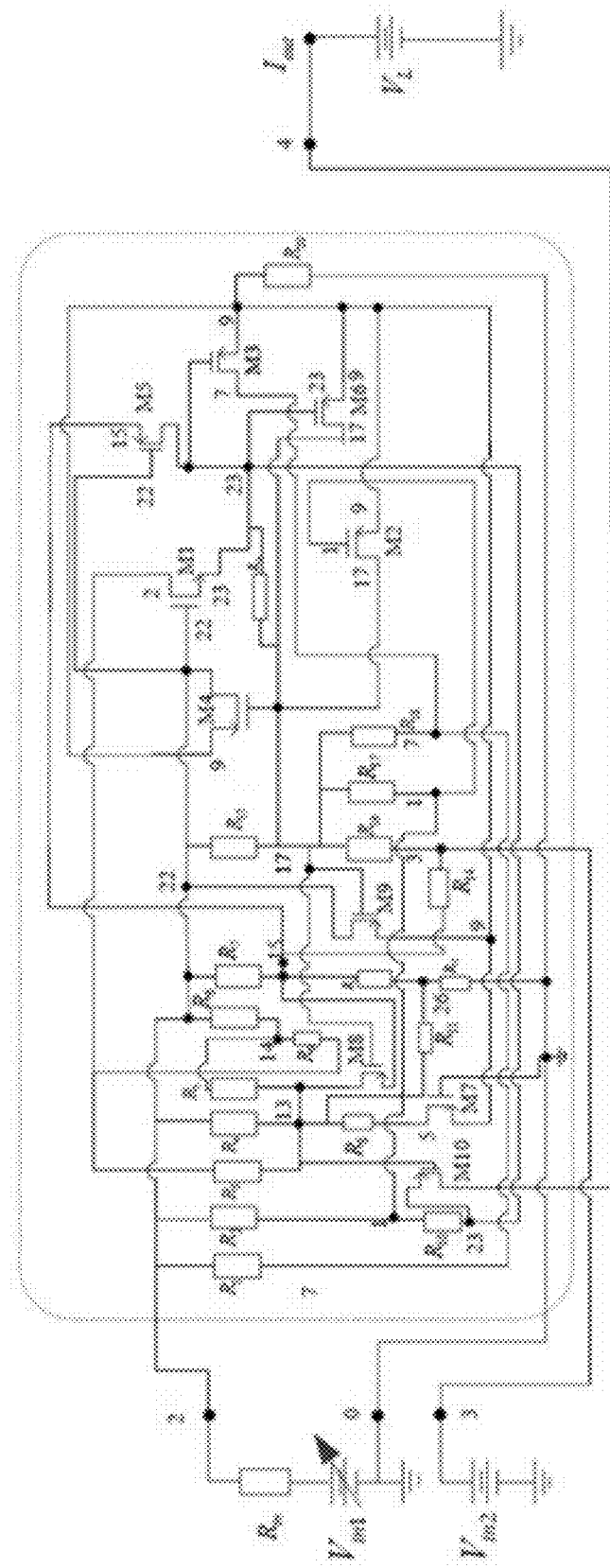
FIG. 13 illustrates a schematic structural diagram of a Gaussian function generator circuit generated by utilizing the method for automatic design of analog circuits based on tree structure in an embodiment of the present disclosure.
Figure 14:
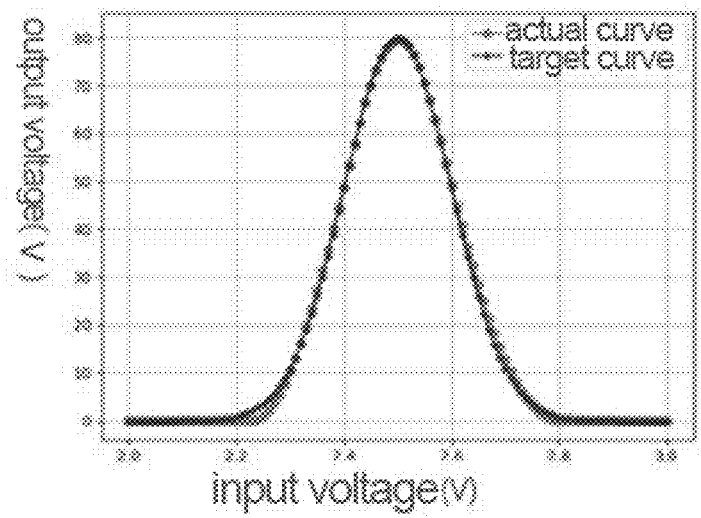
FIG. 14 illustrates a comparison diagram of an output curve and target curve corresponding to FIG. 13 obtained by a netlist simulation generated by utilizing the method for automatic design of analog circuits based on tree structure in an embodiment of the present disclosure.

For example, FIG. 13 is a schematic structural diagram of a Gaussian function generator circuit generated by utilizing the method for automatic design of analog circuit based on tree structure in the embodiment of the present disclosure, FIG. 14 illustrates a comparison diagram of an output curve and target curve corresponding to FIG. 13 obtained by a netlist simulation generated by utilizing the method for automatic design of analog circuit based on tree structure in the embodiment of the present disclosure. Referring to FIG. 13, the Gaussian function generator circuit generated by the method for automatic design of analog circuit based on tree structure contains 30 devices, wherein the resistors include $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$, $R_{15}$, $R_{16}$, $R_{17}$, $R_{18}$, $R_{19}$, and $R_{20}$, transistors include $M_1$, $M_2$, $M_3$, $M_4$, $M_5$, $M_6$, $M_7$, $M_8$, $M_9$, and $M_{10}$, and the port nodes in the Gaussian function generator circuit Include 0, 1, 2, 3, 5, 7, 9, 13, 14, 15, 17, 22, 23 and 26, the port node in the Gaussian function generator circuit is the terminal node in the circuit topology, and $R_{in}$ can be Devices in embryonic circuits. Referring to FIG. 13, the Gaussian function generator circuit generated by the method for automatic design of analog circuit based on tree structure contains 30 devices, wherein the resistors include $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$, $R_{15}$, $R_{16}$, $R_{17}$, $R_{13}$, $R_{19}$, and $R_{20}$, transistors include $M_1$, $M_2$, $M_3$, $M_4$, $M_5$, $M_6$, $M_7$, $M_8$, $M_9$, and $M_{10}$, and port nodes in the Gaussian function generator circuit include 0, 1, 2, 3, 5, 7, 9, 13, 14, 15, 17, 22, 23 and 26, the port node in the Gaussian function generator circuit is the terminal node in the circuit topology, and $R_{in}$ can be devices in embryonic circuits. Referring to FIG. 13, the connection of the Gaussian function generator circuit generated by the method for automatic design of analog circuit based on tree structure is reasonable, there is no disorder of connection, and there is no hanging node, and the parameter values of each device are also obtained, and The number of generated devices is 30, and the number of devices is also very reasonable, and there are no redundant devices. Referring to FIG. 14, the output curve of the Gaussian function generator circuit almost overlaps the target curve, so the rationality of the Gaussian function generator circuit generated by the method for automatic design of analog circuit based on tree structure is verified.

Figure 15:
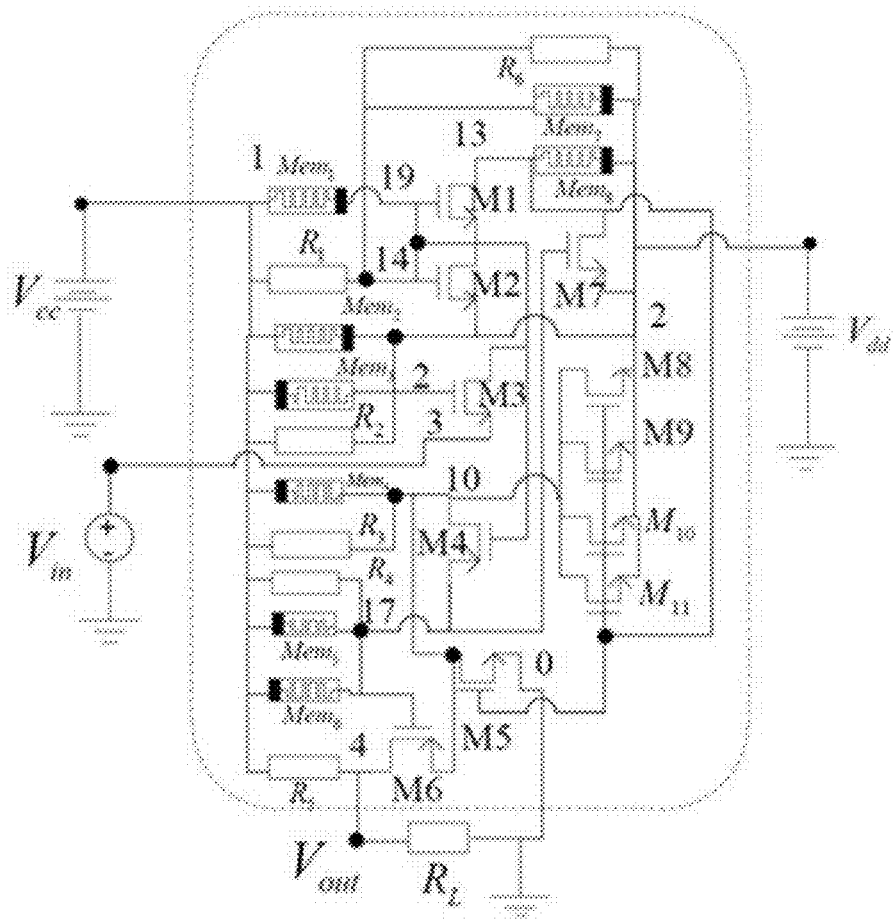
FIG. 15 illustrates a structure diagram of the memristor-based pulse generator circuit generated by utilizing the method for automatic design of analog circuits based on tree structure in an embodiment of the present disclosure.
Figure 16:
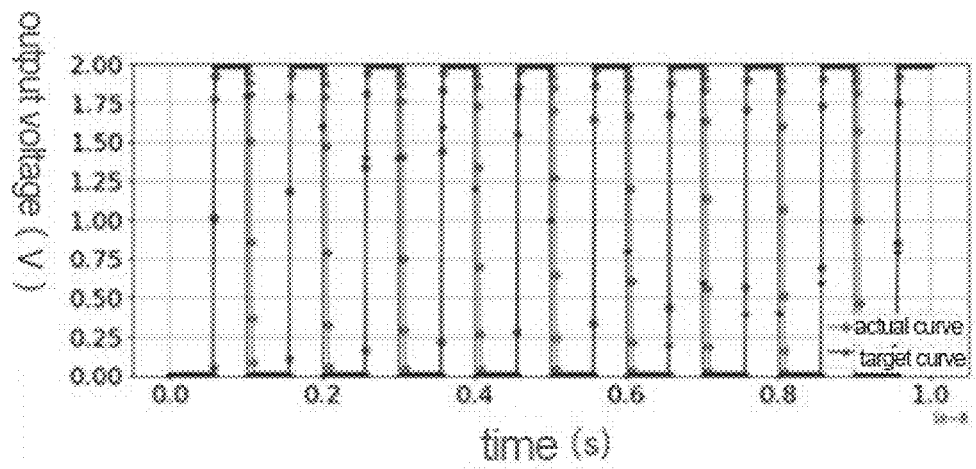
FIG. 16 illustrates a comparison diagram of an output curve and target curve corresponding to FIG. 15 obtained by a netlist simulation generated by utilizing the method for automatic design of analog circuits based on tree structure in an embodiment of the present disclosure.

For example, FIG. 15 is a structure diagram of the memristor-based pulse generator circuit generated by utilizing the method for automatic design of analog circuit based on tree structure in the embodiment of the present disclosure, FIG. 16 is a comparison diagram of an output curve and target curve corresponding to FIG. 15 obtained by a netlist simulation generated by utilizing the method for automatic design of analog circuit based on tree structure in the embodiment of the present disclosure. Referring to FIG. 15, the memristor-based pulse generation circuit generated by the method for automatic design of analog circuit based on tree structure contains 25 devices, wherein the resistors include $R_1$, $R_2$, $R_3$, $R_4$, $R_5$ and $R_6$, and the transistors include $M_1$, $M_2$, $M_3$, $M_4$, $M_5$, $M_6$, $M_7$, $M_8$, $M_9$, $M_{10}$, and $M_{11}$, and the memristors include $Mem_1$, $Mem_2$, $Mem_3$, $Mem_4$, $Mem_5$, $Mem_6$, $Mem_7$, and $Mem_8$, and port nodes in memristor-based pulse generation circuits Include 0, 1, 2, 3, 4, 10, 13, 14, 17 and 19, the port node in the memristor-based pulse generation circuit is the terminal node in the circuit topology, and $R_{in}$ can be a device in the embryonic circuit. Referring to FIG. 15, the voltage $V_{out}$ can be output by inputting the voltages $V_{in}$, $V_{cc}$ and $V_{dd}$. The resistance value of the resistor can be obtained according to the tree structure of the device parameter, for example, $R_1=2021.9\Omega$, $R_2=200.0\Omega$, $R_3=200K\Omega$, $R_4=200\Omega$, $R_5=31710.1\Omega$ and $R_6=46823.1\Omega$, and here is just a case of the resistance parameter value, and it is not limited. Referring to FIG. 15, the connection of the memristor-based pulse generation circuit generated by the method for automatic design of analog circuit based on tree structure is reasonable, and there is no phenomenon of connection disorder. There is no hanging node, and the parameter values of each device are also obtained, and the number of generated devices is 25, and the number of devices is also very reasonable, and there are no redundant devices. Referring to FIG. 16, the output curve of the memristor-based pulse generation circuit almost overlaps with the target curve, so the rationality of the memristor-based pulse generation circuit generated by the method for automatic design of analog circuit based on tree structure is verified.

Figure 17:
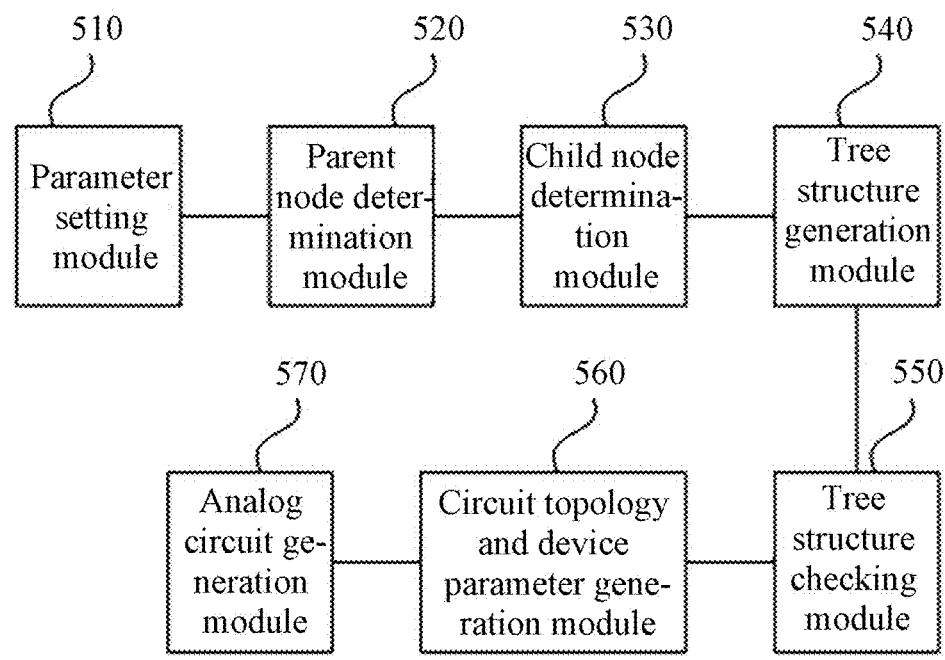
FIG. 17 illustrates a schematic structural diagram of a device for automatic design of analog circuits based on tree structure in an embodiment of the present disclosure.

FIG. 17 is a schematic structural diagram of an apparatus for automatic design of analog circuits based on tree structure in the embodiment of the present disclosure, referring to FIG. 17, the apparatus for automatic design of analog circuits based on tree structure comprises:

a parameter setting module 510, used for setting a maximum height and growth direction of a tree structure;

a parent node determination module 520, used for calling a node randomly from a function node library as a parent node;

a child node determination module 530, used for calling a node randomly from the function node library and a port node library as a child node according to the growth direction;

a tree structure generation module 540, used for generating a tree structure when it is determined that the child node is a terminal node;

a tree structure checking module 550, used for checking the tree structure;

a circuit topology and device parameter generation module 560, used for obtaining a circuit topology and a device parameter conforming to circuit rules if the tree structure satisfies preset conditions;

an analog circuit generation module 570, used for evolving the circuit topology and the device parameter, generating an analog circuit.

The apparatus for automatic design of analog circuits based on tree structure provided by the present embodiment is to implement the method for automatic design of analog circuits based on tree structure in the above-mentioned embodiments. The above-mentioned embodiments are similar, and are not repeated here.

Optionally, the tree structure checking module comprises at least one of the following:

a terminal node checking unit, used for checking the terminal node of the tree structure to determine whether the terminal node contains all external ports of a predefined embryonic circuit.

a hanging node checking unit, used for checking whether there is a hanging node in the tree structure.

Optionally, the hanging node checking unit is specifically used for checking whether assigned number of the same terminal node in the tree structure is greater than or equal to preset number; there is no hanging node in the tree structure if the assigned number of the same terminal node in the tree structure is greater than or equal to the preset number.

a tree structure height checking unit, used for checking whether the height of the tree structure exceeds the maximum height.

Optionally, the analog circuit generation module comprises:

a population parameter setting unit, used for setting population parameter, the parameter comprises at least a size of the population, a topological structure crossover rate, a value crossover rate, a mutation rate, and a preset iteration times;

a population individual generating unit, used for initializing the population, and generating population individuals to be evolved according to the size of the population;

a fitness evaluation unit, used for evaluating a fitness value of the population individuals;

an elite individual selection unit, used for selecting elite individuals from the population individuals through an elite strategy according to the fitness value;

a first cross unit, used for determining whether to perform an individual topological crossover according to the topological structure crossover rate, and selecting a first parent individual from the elite individuals through a tournament strategy and the first parent individual crossing with the elite individual if the individual topological crossover is performed;

a second cross unit, used for determining whether to perform an individual value crossover according to the value crossover rate, and selecting a second parent individual from the elite individuals through the tournament strategy, the second parent individual crossing with the elite individual if the individual value crossover is performed;

a mutation unit, used for determining whether to perform an individual mutation operation according to the mutation rate, randomly selecting the operation of adding or deleting nodes if the individual mutation operation is performed;

a population update unit, used for updating the population and iteration times;

an analog circuit generation unit, used for ending the iterations and generating the analog circuit when it is determined that the iteration times is equal to the preset iteration times.

Optionally, the apparatus for automatic design of analog circuits based on tree structure further comprises:

a node library determination module, used for determining the function node library and the port node library;

an embryonic circuit predefined module, used for predefining an embryonic circuit.

Optionally, the apparatus for automatic design of analog circuit based on tree structure further comprises:

a netlist generation module, used for generating a netlist according to the tree structure;

an analog circuit simulation module, used for simulating by using the netlist to obtain an output curve of the analog circuit.

Figure 18:
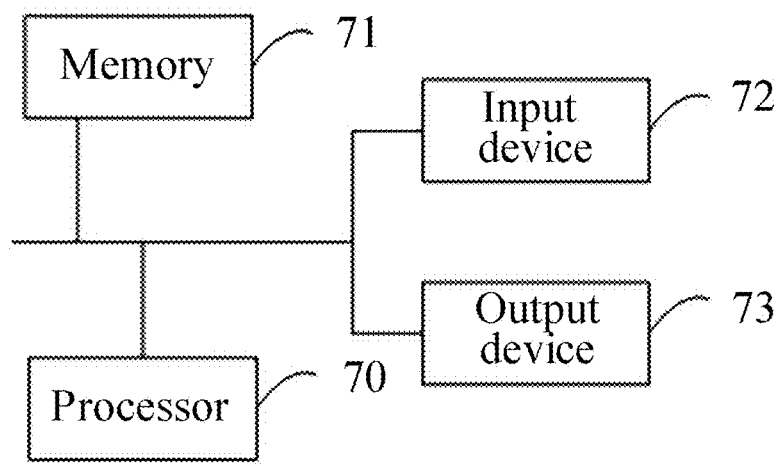
FIG. 18 illustrates a schematic diagram of an electronic equipment automatic design of analog circuits based on tree structure in an embodiment of the present disclosure.

FIG. 18 illustrates a schematic diagram of an computer device for automatic design of analog circuits based on tree structure in an embodiment of the present disclosure, as shown in FIG. 18, the device includes a processor 70, a memory 71, an input device 72 and an output device 73; the number of processors 70 in the device can be one or more, and one processor 70 is taken as an example in FIG. 18; the processor 70, the memory 71, the input device 72 and the output device 73 in the device may be connected by a bus or other means, and the connection by a bus is taken as an example in FIG. 18.

As a computer-readable storage medium, the memory 71 can be used to store software programs, computer-executable programs, and modules, such as program instructions/modules corresponding to the method for automatic design of analog circuit based on tree structure in the embodiment of the present disclosure (for example, based on the parameter setting module 510, the parent node determination module 520 and the child node determination module 530 in the device for automatic design of analog circuit based on tree structure, etc.) The processor 70 executes various function applications and data processing of the device by running the software programs, instructions and modules stored in the memory 71, that is, to implement the above-mentioned method for automatic design of analog circuit based on tree structure.

The memory 71 can mainly include the storage program area and the storage data area. The storage program area can store the operating system and at least one application required for function; the store data area can store data created according to the use of the terminal, etc. In addition, the memory 71 can include high-speed random-access memory and nonvolatile memory, such as at least one disk memory device, flash memory device, or other nonvolatile solid-state memory devices. In some examples, the memory 71 can further include memory set remotely relative to the processor 70, which can be connected to the device through the network. Examples of the above networks include but are not limited to the Internet, enterprise intranet, LAN, mobile communication network and their combinations.

The input device 72 can be used to receive input digital or character information, and generate key signal input related to user settings and function control of the device. The output device 73 can include display devices such as screen.

The embodiments of the present disclosure also provide a storage medium storing a computer executable instruction, which is used to perform a method for automatic design of analog circuit based on tree structure when executed by a computer processor, the method comprising:

setting a maximum height and a growth direction of a tree structure;

calling a node randomly from a function node library as a parent node;

calling a node randomly from the function node library and a port node library as a child node according to the growth direction;

generating a tree structure if the child node is a terminal node;

checking the tree structure, and obtaining a circuit topology and a device parameter conforming to circuit rules if the tree structure satisfies preset conditions;

evolving the circuit topology and the device parameter, generating an analog circuit.

Of course, the storage medium containing the computer executable instruction provided by the embodiments of the present disclosure, the computer executable instruction is not limited to the above-mentioned method operation, and can also perform the relevant operation in the method for automatic design of analog circuit based on tree structure provided by any embodiments of the present disclosure.

Through the above description of the implementation method, the technical personnel in the field can clearly understand that the disclosure can be realized by software and necessary general hardware, and can also be realized by hardware, but in many cases the former is a better implementation method. Based on this understanding, the technical scheme of the disclosure or the contribution to the existing technology can be reflected in the form of software products. The computer software products can be stored in the computer readable storage medium, such as the computer's disk, the read-only memory (ROM), the random access memory (RAM), the flash memory (FLASH), the hard disk or the optical disk, etc. Several instructions are included to enable a computer device (such as a personal computer, a server, or a network device) to perform the methods described in each embodiment of the disclosure.

It is worth noting that the units and modules included in the implementation of the above mentioned device are only divided according to function logic, but are not limited to the above division, as long as the corresponding functions can be achieved; in addition, the specific names of each function unit are only to facilitate mutual distinction, and are not used to limit the protection scope of the disclosure.

It should be understood that, the above is only the preferred embodiments of the present disclosure and the technical principle used. Technical personnel in this field will understand that the disclosure is not limited to the specific implementation cases described here, and can carry out various obvious changes, adjustments and substitutions for technical personnel in this field without breaking away from the protection scope of the disclosure. Therefore, although a more detailed description of the disclosure is given through the above implementation cases, the disclosure is not limited to the above implementation cases, but may include more other equivalent implementation cases without departing from the idea of the disclosure, and the scope of the disclosure is determined by the scope of the appended claims.

What is claimed is:

1. A method for automatic design of analog circuits based on tree structure, comprising:

setting a maximum height and a growth direction of a tree structure;

calling a node randomly from a function node library as a parent node;

calling a node randomly from the function node library and a port node library as a child node according to the growth direction;

generating a tree structure if the child node is a terminal node;

checking the tree structure, and obtaining a circuit topology and a device parameter conforming to circuit rules if the tree structure satisfies preset conditions; and evolving the circuit topology and the device parameter, generating an analog circuit.

2. The method for automatic design of analog circuits based on tree structure according to claim 1, wherein checking the tree structure comprises at least one of:

checking the terminal node of the tree structure to determine whether the terminal node contains all external ports of a predefined embryonic circuit;

checking whether there is a hanging node in the tree structure; and checking whether a height of the tree structure exceeds the maximum height.

3. The method for automatic design of analog circuits based on tree structure according to claim 2, wherein checking whether there is a hanging node in the tree structure comprises:

checking whether an assigned number of same terminal nodes in the tree structure is greater than or equal to a preset number; there is no hanging node in the tree structure if the assigned number of the same terminal nodes in the tree structure is greater than or equal to the preset number.

4. The method for automatic design of analog circuits based on tree structure according to claim 1, wherein evolving the circuit topology and the device parameter, and generating an analog circuit comprises:

setting a population parameter, the population parameter is selected from the group consisting of a size of the population, a topological structure crossover rate, a value crossover rate, a mutation rate, and a preset iteration times;

initializing the population, and generating population individuals to be evolved according to the size of the population;

evaluating a fitness value of the population individuals;

selecting elite individuals from the population individuals through an elite strategy according to the fitness value;

determining whether to perform an individual topological crossover according to the topological structure crossover rate, and when the individual topological crossover is performed, selecting a first parent individual from the elite individuals through a tournament strategy and the first parent individual crossing with the elite individual;

determining whether to perform an individual value crossover according to the value crossover rate, and when the individual value crossover is performed, selecting a second parent individual from the elite individuals through the tournament strategy, the second parent individual crossing with the elite individual;

determining whether to perform an individual mutation operation according to the mutation rate, when the individual mutation operation is performed randomly selecting the operation of adding or deleting nodes;

updating the population and the iteration times; and ending iterations and generating the analog circuit when it is determined that the iteration times is equal to the preset iteration times.

5. The method for automatic design of analog circuits based on tree structure according to claim 1, wherein before setting the maximum height and growth direction of the tree structure, further comprising:

determining the function node library and the port node library;

predefining an embryonic circuit.

6. The method for automatic design of analog circuit based on tree structure according to claim 1, further comprising:

generating a netlist according to the tree structure; and simulating by using the netlist to obtain an output curve of the analog circuit.

7. A computer device for automatic design of analog circuits based on tree structure, comprising:

a processor, configured to realize the method for automatic design of analog circuits based on tree structure according to claim 1 when executing a computer program.

8. A non-transitory computer readable storage medium storing a computer program, comprising realizing the method for automatic design of analog circuits based on tree structure according to claim 1 when the computer program is executed by a processor.

9. An apparatus for automatic design of analog circuits based on tree structure, comprising:

a parameter setting module, configured to set a maximum height and a growth direction of a tree structure;

a parent node determination module, configured to call a node randomly from a function node library as a parent node;

a child node determination module, configured to call a node randomly from the function node library and a port node library as a child node according to the growth direction;

a tree structure generation module, configured to generate a tree structure when it is determined that the child node is a terminal node;

a tree structure checking module, configured to check the tree structure;

a circuit topology and device parameter generation module, configured to obtain a circuit topology and a device parameter conforming to circuit rules if the tree structure satisfies preset conditions; and an analog circuit generation module, configured to evolve the circuit topology and the device parameter, to generate an analog circuit.

10. The apparatus for automatic design of analog circuits based on tree structure according to claim 9, wherein the tree structure checking module comprises at least one of:

a terminal node checking unit, u configured to check the terminal node of the tree structure to determine whether the terminal node contains all external ports of a predefined embryonic circuit;

a hanging node checking unit, configured to check whether there is a hanging node in the tree structure; and a tree structure height checking unit, configured to check whether a height of the tree structure exceeds the maximum height.

\* \* \* \* \*